Figure 1:
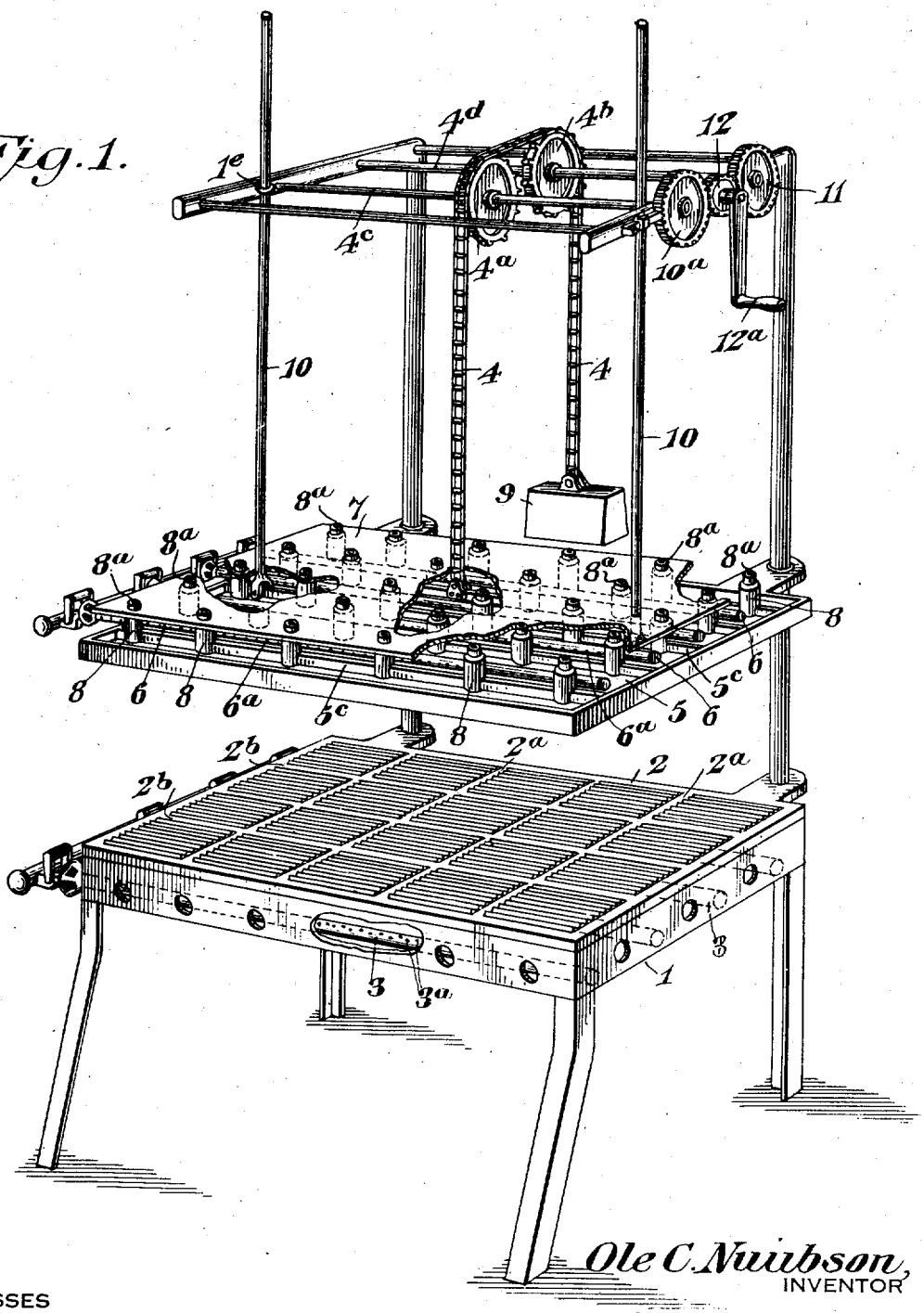

O. C. NUUBSON.

BAKING APPARATUS.

APPLICATION FILED JAN. 6, 1914.

Reissued Oct. 13, 1914.

13,808.

2 SHEETS—SHEET 1.

Ole C. Nuubson,
INVENTOR

WITNESSES

Jas. K. McCathran

F. G. Chapman

BY E. G. Siggers

ATTORNEY.

O. C. NUUBSON.
BAKING APPARATUS.
APPLICATION FILED JAN. 6, 1914.
Reissued Oct. 13, 1914. 13,808.
2 SHEETS—SHEET 2.
*Fig. 2.*
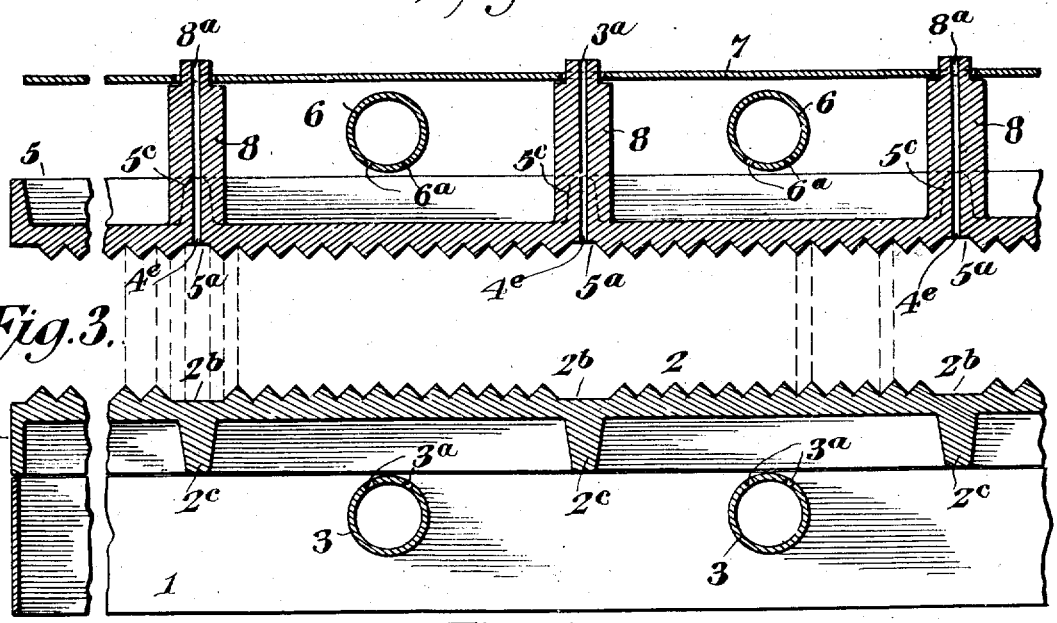
*Fig. 3.*
*Fig. 4.*
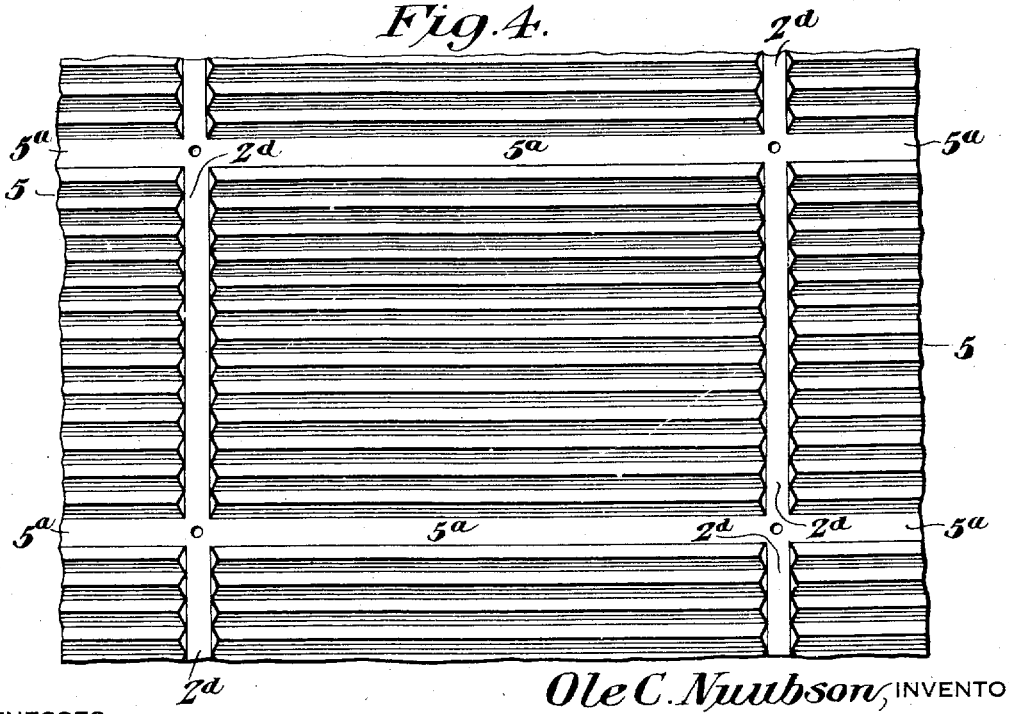
WITNESSES
Jas. K. McCathran
F. T. Chapman
Ole C. Nuubson, INVENTOR
BY E. G. Siggers
ATTORNEY

UNITED STATES PATENT OFFICE

OLE C. NUUBSON, OF DULUTH, MINNESOTA.

BAKING APPARATUS.

13,808. Specification of Reissued Letters Patent. Reissued Oct. 13, 1914.

Original No. 1,031,085, dated July 2, 1912, Serial No. 631,460. Application for reissue filed January 6, 1914. Serial No. 810,685.

*To all whom it may concern:*

Be it known that I, OLE C. NUUBSON, a subject of Norway, residing in Duluth, in the county of St. Louis and State of Minnesota, have invented certain new and useful Improvements in Baking Apparatus; and I do hereby declare the following is a full, clear, and exact description of the invention, such as will enable others skilled in the art to make and use the same.

My invention relates to bread baking apparatus and has for its object the provision of a simple and cheap apparatus for baking crisp wafer bread.

It consists in the constructions, combinations and arrangements of parts hereinafter described and claimed.

In the drawings: Figure 1 is a perspective view of my invention, partly broken away. Fig. 2 is a central vertical transverse view of an upper baking plate forming part of said invention. Fig. 3 is a central vertical transverse view of a lower baking plate forming part of said invention. Fig. 4 is a bottom plan view of a portion of the upper baking plate.

In the drawings, 1 is a stationary frame, of any suitable construction, upon which is mounted a lower baking plate 2, provided with a corrugated upper surface, in which plate are preferably formed channels $2^a$ intersecting the corrugations therein and with channels $2^b$ running parallel with the corrugations, which channels are for the purpose of conveying away steam generated in the dough while baking, and for the further purpose of making the surface of the plate and the dough thereon into a plurality of rectangles. Supported on said frame and extending beneath said lower plate, are a plurality of heating elements of any suitable character or construction, as gas pipes 3, having upwardly directed ports $3^a$ adapted to direct the gas toward the bottom of said lower plate. Said lower plate is also preferably provided with suitable ribs $2^c$ upon its lower side to prevent warping and to strengthen the plate. Suspended by any suitable means above said lower plate, as by a sprocket chain 4 running over sprocket pulleys $4^a$ and $4^b$ mounted on shafts $4^c$ and $4^d$ supported on said frames, is an upper baking plate 5, provided with a corrugated lower surface, in which is preferably formed channels $2^d$ intersecting said corrugations and with channels $5^a$ running parallel to said corrugations, which channels are for the purpose of conveying away steam generated in the dough while baking, and for the further purpose of marking the corrugated surface of said upper plate into rectangles. The upper surface of said upper plate is preferably provided with strengthening ribs $5^c$. Said channels in said upper plate preferably register with the channels in said lower plate. Mounted upon said upper plate and extending over the same are a plurality of heating elements of any suitable character or construction, as gas pipes 6 having downwardly directed ports $6^a$ adapted to direct the burning gas toward the upper surface of said upper plate. Mounted on said upper plate and spaced therefrom and extending over said heating elements thereon is a cover sheet 7 of any suitable construction, preferably constructed of heat insulating material as asbestos. Formed in said upper plate and preferably intersecting said channels therein are a plurality of steam exhaust ports $4^e$, and mounted upon said plate and extending through said cover sheet are a plurality of nipples 8 having ports $8^a$ formed therein registering with said ports $4^e$ through which steam generated in the dough while baking may escape. Upon the free end of said sprocket chain is preferably suspended a counter weight 9. Guide rods 10 are preferably mounted on said upper plate and extend through guides $1^e$ forming part of said frame and upon the ends of said shafts $4^c$ and $4^d$ are mounted gears $10^a$ and 11 respectively for rotating said shafts, when it is desired to lower or raise said upper plate, and intermediate of said gears and engaged therewith is a pinion 12 for turning said gears, said pinion being preferably provided with a crank handle $12^a$ whereby it may be rotated.

In operation, the baking plates are first heated and the dough having been rolled out into a thin layer is then spread or laid upon the lower baking plate, the upper baking plate is then lowered on to the dough and by giving the pinion and gears an extra turn in the proper direction the counter weight may be lifted so as to permit the full weight of the upper baking plate and of the parts mounted thereon to rest upon the dough, thereby squeezing the dough into the depressions of the corrugated surfaces and pressing it into a very thin paper-like wafer, in which form it bakes quickly and crisply. The upper plate is then lifted and the wafer-bread product is removed, the parts corresponding to the steam conveying channels facilitating the separation of the product into sections of regular size for packing and marketing.

While I have described one form of my invention, it is obvious that such form and construction may be modified in various details within the spirit and scope of the claims.

What I claim is:—

1. In a baking apparatus, the combination with a suitable support, of a lower baking plate, an upper baking plate, a cover sheet extending over said upper plate and spaced therefrom, said upper plate having steam exhaust ports extending therethrough, nipples mounted upon said upper plate and extending through said cover sheet, said nipples having steam exhaust passages formed therein communicating with the steam exhaust passages in said upper plate and means for applying heat to one of said plates.

2. In a baking apparatus, two relatively movable baking plates adapted to compress a layer of dough into a thin wafer-like form and provided with matching channels extended along the baking surfaces for the collection of steam generated in the dough during the baking operation, said channels being in communication with the atmosphere for the escape of the collected steam.

3. In a baking apparatus, two relatively movable baking plates adapted to compress a layer of dough into a thin wafer-like form and provided with matching channels for the collection of steam generated in the dough during the baking operation, said channels having communication with the atmosphere for the escape of the collected steam and located to mark lines of division in the baked product for the separation thereof into smaller sections.

4. In a baking apparatus, means for compressing a layer of dough into a thin wafer-like form and baking it in such form, said compressing and baking means having channels for the collection of steam generated in the dough during the baking operation, said channels having communication with the atmosphere for the escape of the collected steam and located to mark division lines in the baked product for the separation of the latter into smaller sizes for packaging and marketing.

5. In a baking apparatus, two baking plates movable toward and from each other and adapted to be moved into such close relation as to compress a layer of dough into a thin wafer-like form for baking, the dough engaging faces of the plates having matching corrugations and matching intercommunicating channels, the latter extending along said faces and constituting collection means for steam generated in the dough during the baking operation and communicating with the atmosphere for the escape of the steam so collected and said channels also defining in the baked product division lines for the separation thereof into smaller sections.

6. In a baking apparatus, a baking plate having its active surface corrugated and provided with channels extending therealong for the collection of steam generated during the baking operation, said channels communicating with the atmosphere for the escape of the collected steam.

7. In a baking apparatus, a baking plate having its active surface corrugated and provided with channels for the collection of steam generated during the baking operation, the channels being located and extended in directions to define in the baked product division marks for the separation of the baked product into smaller sections, and also communicating with the atmosphere for the escape of the collected steam.

8. In a baking apparatus, a baking plate having a substantially flat baking surface with channels formed therein and extending therealong for the collection of steam generated during the baking operation and communicating with the atmosphere for the escape of the collected steam.

9. In a baking apparatus, a baking plate having a substantially flat active face provided with numerous corrugations, and channels dividing the corrugated surface into sections, said channels constituting collection and escape means for steam generated during the baking operations and producing division marks in the baked product for the separation of the latter into smaller sections.

10. In a baking apparatus, a suitable support, a baking plate mounted therein and provided with heating means, another baking plate also provided with heating means and located above the first-named plate, a chain connected to and suspending the second-named plate, a counter-weight carried by the chain at the end thereof remote from the second-named plate, guiding means for the second-named plate, and manipulating means for the second-named plate including sprocket wheel supporting means for the chain between said second-named plate and the counterweight.

11. In a baking apparatus, a suitable support, a baking plate mounted therein and provided with a corrugated upper surface, another plate mounted in the support for movement toward and from the first-named plate and provided with a corrugated lower surface adapted to that of the first-named plate for compressing a layer of dough into a thin wafer-like form, a counterweight for the second-named plate, and manipulating means for moving the second-named plate toward and from the first-named plate, one of the plates being provided with channels having ports leading therefrom for the collection and escape of steam generated in the dough during the baking operation, and both of the plates being provided with means for the application of heat thereto.

12. In a baking apparatus, a suitable support, a baking plate mounted therein and provided with a corrugated upper surface, another plate mounted in the support for movement toward and from the first-named plate and provided with a corrugated lower surface adapted to that of the first-named plate for compressing a layer of dough into a thin wafer-like form, a counterweight for the second-named plate, and manipulating means for moving the second-named plate toward and from the first-named plate, one of the plates being provided with channels having ports leading therefrom for the collection and escape of steam generated in the dough during the baking operation and both of the plates being provided with means for the application of heat thereto, the channels being arranged in number and location to produce division marks in the baked product for facilitating the separation of the latter into smaller sections.

13. In a baking apparatus, a baking plate having its active face corrugated and provided with intersecting channels dividing the corrugated face into sections and having means for the escape of steam collected in the channels during the baking operation.

In testimony whereof, I hereunto affix my signature in the presence of two witnesses.

OLE C. NUUBSON.

Witnesses:
H. O. HANSON,
GEO. S. NUBSON.